United States Patent
Liu et al.

(10) Patent No.: US 10,724,631 B2
(45) Date of Patent: Jul. 28, 2020

(54) METHOD FOR CONTROLLING NEUTRAL GEAR OF AUTOMATIC TRANSMISSION

(71) Applicant: Guangzhou Automobile Group Co., Ltd., Guangzhou, Guangdong (CN)

(72) Inventors: Xinbo Liu, Guangdong (CN); Shihua Lan, Guangdong (CN); Youhui Chen, Guangdong (CN)

(73) Assignee: Guangzhou Automobile Group Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 16/307,150

(22) PCT Filed: Jul. 24, 2017

(86) PCT No.: PCT/CN2017/094131
§ 371 (c)(1),
(2) Date: Dec. 5, 2018

(87) PCT Pub. No.: WO2018/019207
PCT Pub. Date: Feb. 1, 2018

(65) Prior Publication Data
US 2019/0136968 A1    May 9, 2019

(30) Foreign Application Priority Data
Jul. 25, 2016   (CN) .......................... 2016 1 0592772

(51) Int. Cl.
*B60W 10/10*    (2012.01)
*F16H 61/02*    (2006.01)
(Continued)

(52) U.S. Cl.
CPC ......... *F16H 61/0213* (2013.01); *F16H 59/54* (2013.01); *B60W 10/10* (2013.01);
(Continued)

(58) Field of Classification Search
CPC ............ Y10T 477/647; Y10T 477/648; B60W 10/10; B60W 10/188; B60W 30/18018;
(Continued)

(56) References Cited

U.S. PATENT DOCUMENTS 8,634,994 B2 * 1/2014 Monsere ................ B60W 10/11
180/275
2001/0041646 A1 11/2001 Lee
(Continued)

FOREIGN PATENT DOCUMENTS

| CN | 102537307 A | 7/2012 |
| CN | 102563038 A | 7/2012 |

(Continued)

OTHER PUBLICATIONS

English translation of JP4983249B2; http://translationportal.epo.org; Jan. 6, 2020 (Year: 2020).*

(Continued)

*Primary Examiner* — Roger L Pang
(74) *Attorney, Agent, or Firm* — Gang Yu

(57) ABSTRACT

Disclosed is a method for controlling a neutral gear of an automatic transmission. The method includes: when a neutral gear control function of the automatic transmission is in an activated state, an automatic Transmission Control Unit (TCU) collects information on a pressure of a brake main cylinder, a state of a brake pedal, and whether an autohold function is in an activated state or not; and when the pressure of the brake main cylinder is smaller than a pressure threshold $P_3$ of the neutral gear control function and the autohold function is in an inactivated state, or when the brake pedal is in an unstamped state and the autohold function is in the inactivated state, the automatic TCU controls the neutral gear control function to exit from the activated state.

11 Claims, 1 Drawing Sheet

(51) Int. Cl.
*F16H 59/54* (2006.01)
*B60W 30/18* (2012.01)
*B60W 10/188* (2012.01)
*F16H 59/18* (2006.01)
*F16H 59/44* (2006.01)
*F16H 59/50* (2006.01)
*F16H 59/70* (2006.01)
*F16H 59/72* (2006.01)
*F16H 59/36* (2006.01)

(52) U.S. Cl.
CPC ..... *B60W 10/188* (2013.01); *B60W 30/18018* (2013.01); *B60W 30/18054* (2013.01); *B60W 30/18109* (2013.01); *B60W 30/18118* (2013.01); *B60W 2510/1005* (2013.01); *B60W 2510/182* (2013.01); *B60W 2510/186* (2013.01); *B60W 2510/188* (2013.01); *B60W 2520/10* (2013.01); *B60W 2540/10* (2013.01); *B60W 2710/1005* (2013.01); *B60Y 2300/02* (2013.01); *B60Y 2300/1805* (2013.01); *F16H 59/18* (2013.01); *F16H 59/44* (2013.01); *F16H 59/50* (2013.01); *F16H 59/70* (2013.01); *F16H 59/72* (2013.01); *F16H 2059/366* (2013.01); *Y10T 477/647* (2015.01); *Y10T 477/648* (2015.01)

(58) Field of Classification Search
CPC ..... B60W 30/18054; B60W 30/18109; B60W 30/18118; B60W 2510/1005; B60W 2510/182; B60W 2510/186; B60W 2510/188; B60W 2540/10; B60W 2520/10; B60W 2710/1005; F16H 59/54; F16H 59/70; F16H 59/44; F16H 59/18; F16H 61/20; F16H 2061/207; B60Y 2300/1805

See application file for complete search history.

(56) References Cited

U.S. PATENT DOCUMENTS

| | | | |
|---|---|---|---|
| 2001/0049575 A1* | 12/2001 | Muratomi | F16H 61/20 701/62 |
| 2005/0064988 A1 | 3/2005 | Hasegawa et al. | |
| 2005/0221955 A1 | 10/2005 | Akaike | |
| 2015/0292615 A1* | 10/2015 | Shattuck | F16H 61/0202 701/51 |
| 2016/0298758 A1* | 10/2016 | Fujiyoshi | F16H 61/0204 |
| 2016/0319933 A1* | 11/2016 | Adams | F16H 63/3491 |
| 2019/0093762 A1* | 3/2019 | Lee | F16H 61/20 |

FOREIGN PATENT DOCUMENTS

| | | | | |
|---|---|---|---|---|
| CN | 104455383 A | 3/2015 | | |
| CN | 106195259 A | 12/2016 | | |
| EP | 2017501 A2 * | 1/2009 | | F16H 61/20 |
| JP | 11193866 A | 7/1999 | | |
| JP | 4983249 B2 | 7/2012 | | |
| WO | 2015157668 A1 | 10/2015 | | |

OTHER PUBLICATIONS

International Search Report for PCT application No. PCT/CN2017/094131 filed on Jul. 24, 2017, dated Oct. 18, 2017.

* cited by examiner

METHOD FOR CONTROLLING NEUTRAL GEAR OF AUTOMATIC TRANSMISSION

This application claims priority to Chinese Patent Application No. 201610592772.8 entitled "Method for Controlling Neutral Gear of Automatic Transmission", disclosed by Guangzhou Automobile Group Co, Ltd. and filed on Jul. 25, 2016, the contents of which are incorporated herein by reference in its entirety.

TECHNICAL FIELD

The present disclosure relates to the field of vehicle control systems, and more particularly, to a method for controlling a neutral gear of an automatic transmission.

BACKGROUND

In the related art, in order to reduce the oil consumption of a vehicle and improving the Noise, Vibration and Harshness (NVH) properties of the vehicle, a neutral gear control function of an automatic transmission is provided on more and more vehicles; an automatic Transmission Control Unit (TCU) may control a linear pressure sensor inside the transmission, so that the vehicle to keep at a Drive (D) gear (forward gear); when a driver stamps on a brake and a pressure of a brake main cylinder reaches to a certain value, the automatic transmission is in a neutral state and the power output of an engine is disconnected; and when the driver loosens the brake, the pressure of the brake main cylinder is close to 0 kpa and no longer meets the requirement on neutral gear control in the automatic TCU at this moment, then the neutral gear control is exited.

In order to improve the driving comfort of the vehicle, more and more vehicles are provided with an autohold function. The autohold function refers to that an Electrical Park Brake (EPB) directly brakes a wheel by changing a wheel cylinder pressure in combination with an Electronic Stability Program (ESP). When the driver brakes the vehicle, the autohold function brakes the wheel in terms of a brake requirement of the driver; at this moment, the driver may loosen the brake pedal and the vehicle still automatically keeps stationary, so that a right foot of the driver is liberated. When the system detects a start intention of the driver, for example when the driver stamps on an accelerator, the brake is relieved automatically. This function can guarantee the comfort of starting the vehicle when the brake is automatically relieved and may actively boost the pressure to keep the vehicle stationary when a brake force is insufficient.

In the related art, the neutral gear control function of the automatic transmission and the autohold function are increasingly and widely applied to the vehicle. However, when the two functions exist, simultaneously, an incompatible condition may be occurred with the following reasons.

First, when the driver stamps on the brake pedal at the D rear, the autohold function and the neutral gear control function of the automatic transmission are activated simultaneously. However, the autohold function is designed to relieve the right foot of the driver and improve the driving comfort of the driver. If the driver loosens the brake pedal, the autohold function still keeps the wheel to be braked, the neutral gear control function is exited and the engine outputs a power outward. At this moment, the neutral gear control function can no longer improve the oil consumption and the NVH properties of the vehicle.

Second, when the neutral gear control function is exited, since the engine outputs the power outward, the vehicle has a driving tendency. However, at this moment, the autohold function brakes the wheel to make the vehicle stationary. In this way, the vibration of the vehicle is increased, the comfortable capability becomes poor, and additionally, the oil consumption is also increased.

SUMMARY

In order to solve the technical problem in the conventional art, the present disclosure provides a method for controlling a neutral gear of an automatic transmission. Through the method, a vehicle having a neutral gear control function of the automatic transmission is compatible to an autohold function, and while the oil consumption of the vehicle is reduced and the NVH properties are improved, the driving comfort is also improved.

The embodiments of the present disclosure provide a method for controlling a neutral gear of an automatic transmission, which may include the following steps.

When a neutral gear control function of the automatic transmission is in an activated state, an automatic TCU collects information on a pressure of a brake main cylinder, a state of a brake pedal, and whether an autohold function is in an activated state or not.

When the pressure of the brake main cylinder is smaller than a pressure threshold $P_3$ of the neutral gear control function and the autohold function is in an inactivated state, or when the brake pedal is in an unstamped state and the autohold function is in the inactivated state, the automatic TCU controls the neutral gear control function to exit from the activated state.

Further, when an openness of an accelerator pedal is greater than an exit openness $\beta_2$ of the autohold function, or an engine is in a flameout state, or a driver-side safety belt is unfastened or a driver-side door is opened, or an autohold functional switch is turned off, or an EPB breaks down, or a lasting duration of the autohold function exceeds a duration threshold $T_1$ of the autohold function, or a vehicle is in a sliding state and a vehicle speed exceeds an exit speed $V_4$ of the autohold function, the autohold function enters the inactivated state.

Further, when an automatic transmission system breaks down, or the vehicle speed is greater than an exit speed $V_3$ of the neutral gear control function, or a gear of the automatic transmission is switched to any one gear of an Neutral (N) gear, a Parking (P) gear or a Reverse (R) gear, or a rotational speed of the engine is lower than a first exit rotational speed $N_3$ of the neutral gear control function or higher than a second exit rotational speed $N_4$ of the neutral gear control function, or the openness of the accelerator pedal is greater than a neutral gear control exit openness $\beta_3$, or a temperature of the automatic transmission is lower than a first neutral gear control exit temperature $T_2$ or higher than a second neutral gear control exit temperature $T_3$, or the pressure of the brake main cylinder is smaller than the pressure threshold $P_3$ of the neutral gear control function and the autohold function is in the inactivated state, or the brake pedal is in the unstamped state and the autohold function is in the inactivated state, the automatic TCU controls the neutral gear control function of the automatic transmission to enter the inactivated state.

Further, when the autohold functional switch is turned on, the EPB operates normally, an engine is in an operation state, a vehicle speed is smaller than an activating vehicle speed $V_1$ of the autohold function, a driver stamps on the brake pedal and the pressure of the brake main cylinder is greater than an activating pressure $P_1$ of the autohold function, the autohold function is activated.

Further, the conditions in which the autohold function is activated further include that the driver-side safety belt is fastened and the driver-side door is closed.

Further, when an automatic transmission system works normally, a vehicle speed is smaller than an activating vehicle speed $V_2$ of the neutral gear control function, the automatic transmission is at a D gear, an openness of the accelerator pedal is smaller than an activating openness $\beta_1$ of the neutral gear control function, a rotational speed range of an engine is between a first activating rotational speed $N_1$ of the neutral gear control function and a second activating rotational speed $N_2$ of the neutral gear control function, a slope value is smaller than a neutral gear control activating slope $I_1$, the brake pedal is stamped down, and the pressure of the brake main cylinder is greater than a neutral gear control activating pressure $P_2$, the neutral gear control function of the automatic transmission is activated.

Further, the automatic TCU collects the pressure of the brake main cylinder via a Controller Area Network (CAN) bus or a hardwire input interface from an ESP, collects the state of the brake pedal via an Engine Management System (EMS), and detects whether the autohold function is in the activated state or not via the EPB.

Compared with the conventional art, according to the embodiments of the present disclosure, when detecting that the pressure of the brake main cylinder or the state of the brake pedal meet the conditions that the neutral gear control function is exited from the activated state, the automatic TCU re-detects the state of the autohold function, and judges whether to exit the neutral gear control function or not according to the state of the autohold function. Therefore, the autohold function and the neutral gear control function are compatible, and while the oil consumption of the vehicle is reduced and the NVH properties are improved, the driving comfort is also improved. Further, by adding slope information to the neutral gear control function activating conditions, the vehicle cannot enter the neutral gear control function at a relatively large slope, so that the sliding phenomenon of the vehicle may be effectively prevented, and the safety performance of the vehicle is increased.

DETAILED DESCRIPTION OF THE EMBODIMENTS

In order to further describe the technical means adopted by the embodiments of the present disclosure to achieve the intended purpose and the effects thereof, the embodiments of the present disclosure will be described below in detail with reference to accompanying drawings and preferred embodiment.

Figure 1:
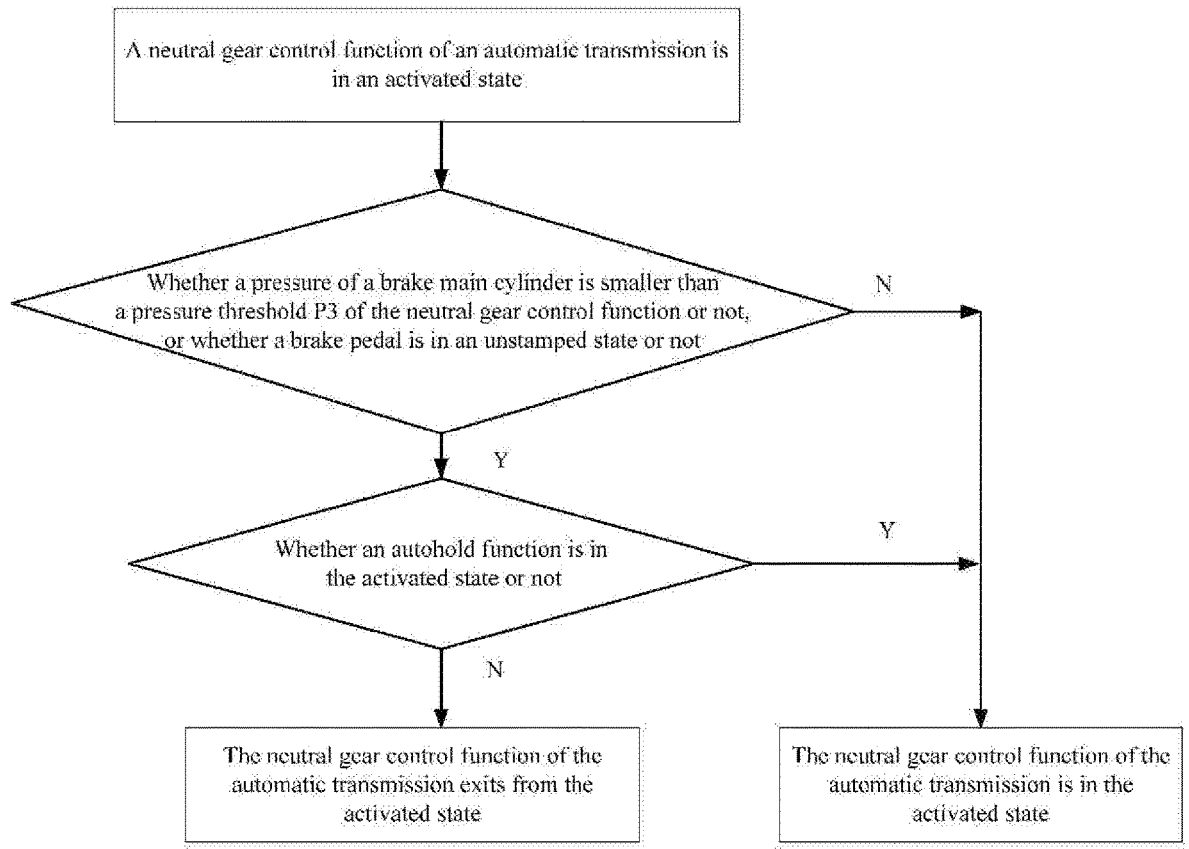
FIG. 1 is a schematic diagram of a logical relationship of a method for controlling a neutral gear of an automatic transmission provided by an embodiment of the present disclosure.
Figure 2:
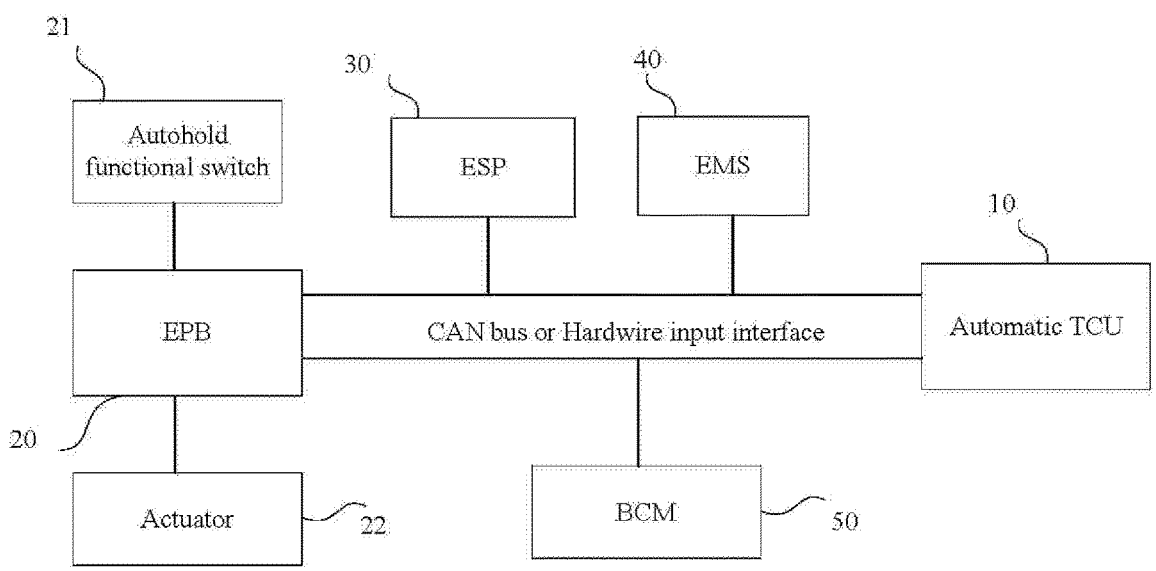
FIG. 2 is a schematic diagram of a connection relationship of each control unit of a vehicle.

An embodiment of the present, disclosure provides a method for controlling a neutral gear of an automatic transmission. Through the method, a vehicle with a neutral gear control function of the automatic transmission can be compatible to an autohold function, and while the oil consumption of the vehicle is reduced and the NVH properties are improved, the driving comfort is also improved. FIG. 1 is a schematic diagram of a logical relationship of a method for controlling a neutral gear of an automatic transmission provided by an embodiment of the present disclosure. FIG. 2 is a schematic diagram of a connection relationship of each control unit of a vehicle. As shown in FIG. 1 and FIG. 2, the method for controlling the neutral gear of the automatic transmission provided by this embodiment of the present disclosure may include the following steps.

When a neutral gear control function of the automatic transmission is in an activated state, an automatic TCU 10 collects information on a pressure of a brake main cylinder, a state of a brake pedal, and whether an autohold function is in an activated state or not.

When the pressure of the brake main cylinder is smaller than a pressure threshold $P_3$ of the neutral gear control function and the autohold function is in an inactivated state, or when the brake pedal is in an unstamped state and the autohold function is in the inactivated state, the automatic TCU 10 controls the neutral gear control function to exit from the activated state.

In the present disclosure, in addition to detecting the pressure of the brake main cylinder or the state of the brake pedal, the automatic TCU 10 further needs to re-detect whether the autohold function is in the activated state or not. If the autohold function is in the activated state, no matter whether the pressure of the brake main cylinder is smaller than the pressure threshold $P_3$ of the neutral gear control function or not or the brake pedal is in the stamped state or not, the neutral gear control function is still in the activated state. Only when the pressure of the brake main cylinder is smaller than the pressure threshold $P_3$ of the neutral gear control function and the autohold function is in the inactivated state, or the brake pedal is not stamped and the autohold function is in the inactivated state, the automatic TCU 10 controls the neutral gear control function to exit from the activated state and an engine outputs a power outward. Therefore, by adopting the method, while the neutral gear control function is controlled, the autohold function can also be considered; and while the oil consumption of the vehicle is reduced and the NVH properties are improved, the driving comfort is also improved.

Specifically, in this embodiment, the automatic TCU 10 collects the pressure of the brake main cylinder via a Controller Area Network (CAN) bus or a hardwire input interface from an ESP 30, collects the state of the brake pedal via an EMS 40, and detects whether the autohold function is in the activated state or not via an EPB 20.

Further, in this embodiment, conditions for activating the autohold function are as follows.

(1) An autohold functional switch 21 is turned on.
(2) The EPB 20 operates normally.
(3) The engine is in an operation state.
(4) A vehicle speed is smaller than an activating vehicle speed $V_1$ of the autohold function, such as 0.1 km/h.
(5) A driver stamps on the brake pedal and the pressure of the brake main cylinder is greater than an activating pressure $P_1$ of the autohold function, such as 200 kpa.

The above values may be adjusted as required. When the above conditions are met completely, the EPB 20 starts the autohold function, that is, the autohold function enters the activated state, and the EPB 20 brakes a wheel via an actuator 22 and keeps the vehicle stationary.

In other embodiments, in order to further improve the safety performance of the vehicle, conditions for judging the activation of the autohold function may include that a driver-side safety belt is fastened and a drive-side door is closed.

In this embodiment, conditions for activating the neutral gear control function of the automatic transmission are as follows.

(1) An automatic transmission system works normally.

(2) The vehicle speed is smaller than an activating vehicle speed $V_2$ of the neutral gear control function, such as 0.1 km/h.

(3) The automatic transmission is at a Drive (D) gear (forward gear).

(4) An openness of an accelerator pedal is smaller than an activating openness $\beta_1$ of neutral gear control function, such as 1%.

(5) A rotational speed range of the engine is between a first activating rotational speed $N_1$ of neutral gear control function such as 400 rpm and a second activating rotational speed $N_2$ of neutral gear control function such as 800 rpm.

(6) A slope value is smaller than a neutral gear control activating slope $I_1$, such as 15%.

(7) The brake pedal is stamped down, and the pressure of the brake main cylinder is greater than a neutral gear control activating pressure $P_2$, such as 700 kpa.

The above values may be adjusted as required. When the above conditions are met completely, the automatic TCU 10 controls the neutral gear control function to enter the activated state and a way that the engine outputs the power outward is cut off. In this embodiment, compared with the related art, the collection and comparison of the slope information are increased, and the vehicle cannot enter the neutral gear control state at a relatively large slope, so that the sliding phenomenon of the vehicle can be effectively prevented and the safety performance of the vehicle is increased.

In this embodiment, conditions that the autohold function exits the activated state are as follows.

(1) The openness of the accelerator pedal is greater than an exit openness $\beta_2$ of the autohold function, such as 2%.

(2) The engine is in a flameout state.

(3) The driver-side safety belt is unfastened.

(4) The driver-side door is opened.

(5) The autohold functional switch 21 is turned off.

(6) The EPB 20 breaks down.

(7) A lasting duration of autohold function exceeds a duration threshold $T_1$ of the autohold function, such as 10 min.

(8) The vehicle is in a sliding state and the vehicle speed exceeds an exit speed $V_4$ of the autohold function, such as 3 km/h.

The above values may be adjusted as required. When the vehicle meets any of the above conditions, the autohold function exits from the activated state and enters the inactivated state, the EPB 20 relieves the brake on the wheel via the actuator 22 and the vehicle may move.

In this embodiment, conditions that the neutral gear control function exits the activated state are as follows.

(1) The automatic transmission system breaks down.

(2) The vehicle speed is greater than an exit speed $V_3$ of the neutral gear control function, such as 0.1 km/h.

(3) A gear of the automatic transmission is switched to any one gear of an N gear, a P gear or an R gear.

(4) A rotational speed of the engine is lower than a first exit rotational speed $N_3$ of the neutral gear control function such as 350 rpm or higher than a second exit rotational speed $N_4$ of the neutral gear control function such as 1600 rpm (herein, the $N_3$ is smaller than the $N_4$).

(5) The openness of the accelerator pedal is greater than a neutral gear control exit openness $\beta_3$, such as 1%.

(6) A temperature of the automatic transmission is lower than a first neutral gear control exit temperature $T_2$ such as 10° C. or higher than a second neutral gear control exit temperature $T_3$ such as 170° C. (herein, the $T_2$ is smaller than the $T_3$).

(7) The pressure of the brake main cylinder is smaller than the pressure threshold $P_3$ of the neutral gear control function such as 500 kpa and the autohold function is in the inactivated state.

(8) The brake pedal is in the unstamped state and the autohold function is in the inactivated state.

The above values may be adjusted as required. When the vehicle meets any of the above conditions, the automatic TCU 10 controls the neutral gear control function of the automatic transmission to exit from the activated state and to enter the inactivated state, the engine outputs the power outward and the vehicle moves according to an actual condition.

It may be understood that, the state of the vehicle may be detected by a corresponding system or module according to the related art. For example, information on a started state of the <autohold functional switch 21, a duration of the autohold functional, whether the EPB 20 is normal or not and the like may be detected by the EPB 20; information of related conditions on whether the door is closed and whether the safety belt is fastened and the like may be detected by a Body Control Module (BCM) 50; information on an operation state of the engine, a rotational speed of the engine, the openness of the accelerator pedal, the state of the brake pedal and the like may be detected by the EMS 40; information of the vehicle speed, the pressure of brake main cylinder, the slope and the like may be detected by the ESP 30; and information of the operation state and the gear of the automatic transmission system, the temperature of the automatic transmission and the like may be detected by the automatic TCU 10. The detailed contents may be referred to the related art and will not be repeated.

In conclusion, according to the embodiments of the present disclosure, when detecting that the pressure of the brake main cylinder or the state of the brake pedal meet the conditions that the neutral gear control function exits from the activated state, the automatic TCU re-detects the state of the autohold function, and judges whether to exit the neutral gear control function or not according to the state of the autohold function. Therefore, the autohold function and the neutral gear control function are compatible, and while the oil consumption of the vehicle is reduced and the NVH properties are improved, the driving comfort is also improved. Further, by adding slope information to the neutral gear control function activating conditions, the vehicle cannot enter the neutral gear control function at a relatively large slope, so that the sliding phenomenon of the vehicle may be effectively prevented, and the safety performance of the vehicle is increased.

The above are only preferred embodiments of the present disclosure and do not limit the present disclosure in any form. Although the preferred embodiments of the present disclosure are described above, these embodiments are not intended to limit the present disclosure. Those skilled in the art may make some changes or modifications to form equivalent embodiments by using the above technical contents without departing from the scope of the technical solutions of the present disclosure. Any simple alternation and equivalent change and modification made to the above embodiments without departing from the contents in the technical solutions of the present disclosure and according to the technical essence of the present disclosure should pertain to the scope of the technical solutions of the present disclosure.

INDUSTRIAL APPLICABILITY

In the embodiments of the present disclosure, when detecting that the pressure of the brake main cylinder or the state of the brake pedal meet the conditions that the neutral gear control function exits from the activated state, the automatic TCU re-detects the state of the autohold function, and judges whether to exit the neutral gear control function or not according to the state of the autohold function. Therefore, the autohold function and the neutral gear control function are compatible, and while the oil consumption of the vehicle is reduced and the NVH properties are improved, the driving comfort is also improved. Further, by adding slope information to the neutral gear control function activating conditions, the vehicle cannot enter the neutral gear control function at a relatively large slope, so that the sliding phenomenon of the vehicle may be effectively prevented, and the safety performance of the vehicle is increased.

What is claimed is:

1. A method for controlling a neutral gear of an automatic transmission, comprising:
    when a neutral gear control function of the automatic transmission is in an activated state, collecting, by an automatic Transmission Control Unit (TCU) (10), information on a pressure, of a brake main cylinder, a state of a brake pedal, and whether an autohold function is in an activated state or not; and
    when the pressure of the brake main cylinder is smaller than a pressure threshold $P_3$ of the neutral gear control function and the autohold function is in an inactivated state, or when the brake pedal is in an unstamped state and the autohold function is in the inactivated state, controlling, by the automatic TCU (10), the neutral gear control function to exit from the activated state;
    wherein when an autohold functional switch (21) is turned on, an Electrical Park Brake (EPB) (20) operates normally, an engine is in an operation state, a vehicle speed is smaller than an activating vehicle speed $V_1$ of the autohold function, and a driver stamps on the brake pedal and the pressure of the brake main cylinder is greater than an activating pressure $P_1$ of the autohold function, the autohold function is activated.

2. The method for controlling the neutral gear of the automatic transmission as claimed in claim 1, wherein when an openness of an accelerator pedal is greater than an exit openness $\beta_2$ of the autohold function, or an engine is in a flameout state, or a driver-side safety belt is unfastened or a driver-side door is opened, or the autohold functional switch (21) is turned off, or the EPB (20) breaks down, or a lasting duration of the autohold function exceeds a duration threshold $T_1$ of the autohold function, or a vehicle is in a sliding state and a vehicle speed exceeds an exit speed $V_4$ of the autohold function, the autohold function enters the inactivated state.

3. The method for controlling the neutral gear of the automatic transmission as claimed in claim 2, wherein when an automatic transmission system breaks down, or the vehicle speed is greater than an exit speed $V_3$ of the neutral gear control function, or a gear of the automatic transmission is switched to any one gear of an Neutral (N) gear, a Parking (P) gear or a Reverse (R) gear, or a rotational speed of the engine is lower than a first exit rotational speed $N_3$ of the neutral gear control function or higher than a second exit rotational speed $N_4$ of the neutral gear control function, or the openness of the accelerator pedal is greater than a neutral gear control exit openness $\beta_3$, or a temperature of the automatic transmission is lower than a first neutral gear control exit temperature $T_2$ or higher than a second neutral gear control exit temperature $T_3$, or the pressure of the brake main cylinder is smaller than the pressure threshold $P_3$ of the neutral gear control function and the autohold function is in the inactivated state, or the brake pedal is in the unstamped state and the autohold function is in the inactivated state, the automatic TCU (10) controls the neutral gear control function of the automatic transmission to enter the inactivated state.

4. The method for controlling the neutral gear of the automatic transmission as claimed in claim 1, wherein conditions in which the autohold function is activated further comprise that a driver-side safety belt is fastened and a driver-side door is closed.

5. The method for controlling the neutral gear of the automatic transmission as claimed in claim 1, wherein when an automatic transmission system works normally, a vehicle speed is smaller than an activating vehicle speed $V_2$ of the neutral gear control function, the automatic transmission is at a D gear, an openness of an accelerator pedal is smaller than an activating openness $\beta_1$ of neutral gear, control function, a rotational speed range of an engine is between a first activating rotational speed $N_1$ of the neutral gear control function and a second activating rotational speed $N_2$ of the neutral gear control function, a slope value is smaller than a neutral gear control activating slope $I_1$, the brake pedal is stamped down, and the pressure of the brake main cylinder is greater than a neutral gear control activating pressure $P_2$, the neutral gear control function of the automatic transmission is activated.

6. The method for controlling the neutral gear of the automatic transmission as claimed in claim 1, wherein the automatic TCU (10) collects the pressure of the brake main cylinder via a Controller Area Network (CAN) bus or hardwire input interface from an Electronic Stability Program (ESP) (30), collects the state of the brake pedal via an Engine Management System (EMS) (40), and detects whether the autohold function is in the activated state or not via the EPB (20).

7. The method for controlling the neutral gear of the automatic transmission as claimed in claim 2, wherein the automatic TCU (10) collects the pressure of the brake main cylinder via a Controller Area Network (CAN) bus or hardwire input interface from an Electronic Stability Program (ESP) (30), collects the state of the brake pedal via an Engine Management System (EMS) (40), and detects whether the autohold function is in the activated state or not via the EPB (20).

8. The method for controlling the neutral gear of the automatic transmission as claimed in claim 3, wherein the automatic TCU (10) collects the pressure of the brake main cylinder via a Controller Area Network (CAN) bus or hardwire input interface from an Electronic Stability Program (ESP) (30), collects the state of the brake pedal via an Engine Management System (EMS) (40), and detects whether the autohold function is in the activated state or not via the EPB (20).

9. The method for controlling the neutral gear of the automatic transmission as claimed in claim 1, wherein the automatic TCU (10) collects the pressure of the brake main cylinder via a Controller Area Network (CAN) bus or hardwire input interface from an Electronic Stability Program (ESP) (30), collects the state of the brake pedal via an Engine Management System (EMS) (40), and detects whether the autohold function is in the activated state or not the EPB (20).

10. The method for controlling the neutral gear of the automatic transmission as claimed in claim 4, wherein the automatic TCU (10) collects the pressure of the brake main cylinder via a Controller Area Network (CAN) bus or hardwire input interface from an Electronic Stability Program (ESP) (30), collects the state of the brake pedal via an Engine Management System (EMS) (40), and detects whether the autohold function is in the activated state or not via the EPB (20).

11. The method for controlling the neutral gear of the automatic transmission as claimed in claim 5, wherein the automatic TCU (10) collects the pressure of the brake main cylinder via a Controller Area Network (CAN) bus or hardwire input interface from an Electronic Stability Program (ESP) (30), collects the state of the brake pedal via an Engine Management System (EMS) (40), and detects whether the autohold function is in the activated state or not via the EPB (20).

\* \* \* \* \*